Jan. 5, 1937.                  G. H. ELLIS                  2,067,046
         TOXIC AGENT AND ITS APPLICATION TO FIBROUS PRODUCTS
                         Filed Aug. 31, 1934
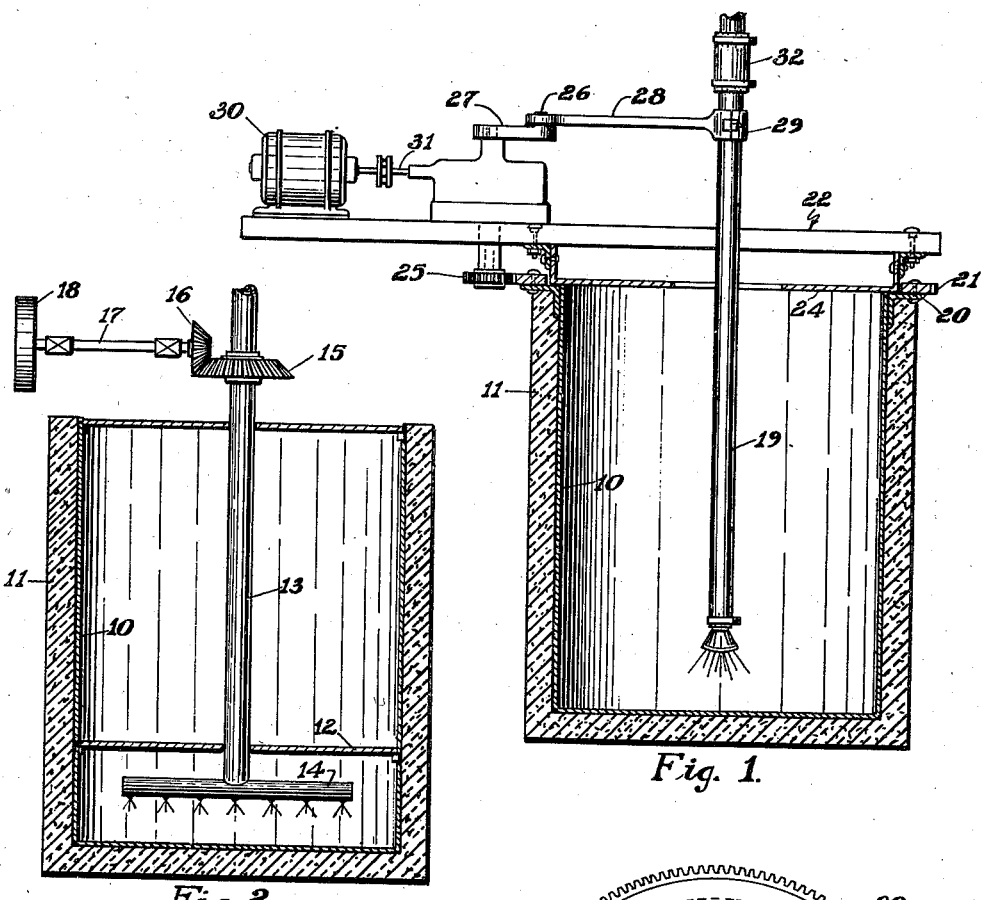
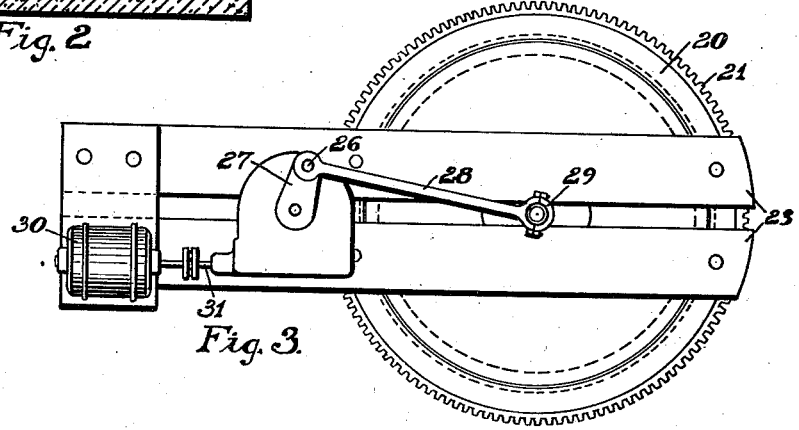
INVENTOR
GEORGE H. ELLIS
By H. F. Woodward
      ATTORNEY Patented Jan. 5, 1937

2,067,046

UNITED STATES PATENT OFFICE 2,067,046

TOXIC AGENT AND ITS APPLICATION TO FIBROUS PRODUCTS

George H. Ellis, St. Paul, Minn., assignor to The Insulite Company, Minneapolis, Minn., a corporation of Minnesota Application August 31, 1934, Serial No. 742,330

10 Claims. (Cl. 92—21)

This invention relates to the preparation of a toxic agent and its application to a fibrous product.

One object of the invention is the incorporation of a toxic agent that is nonpoisonous to human beings in a fibrous product in such manner and under such conditions that it will not be attacked by insects or fungi.

Another object of the invention is to make the fibrous products highly water resistant which is characterized by its low cost of production.

In the general practice of manufacturing fibrous products the fibers are suspended in water in the proportion of 4 parts of fiber to 96 parts of water, the fibrous mass in the water bath is manipulated to form the desired fibrous products and the products thus formed are compressed and dried and in some instances subjected to other steps of manufacture.

Heretofore a great deal of difficulty has been experienced in properly protecting fibrous products with a material that is noninjurious to human beings. Also, a great deal of difficulty has been experienced in the proper dissemination of the toxic material over the fibers so that insects such as termites would be completely repelled.

Many toxic agents have been used but their proper application to the fibrous material has not been successfully accomplished and to insure that the fibrous products are insect repelling and fungi proof it is essential that the toxic material be substantially uniformly dispersed through the entire fibrous material.

For the purpose of this application there has been elected to set forth two particular methods of preparing the toxic agent as well as two methods of applying it to the fibrous material, but it is to be understood that they are here set forth for illustrative purposes only and are not to be accorded any interpretation such as might have the effect of limiting what is claimed in the invention short of its true and comprehensive scope in the art.

Many additional objects of this invention will become apparent with reference to the subjoined specifications and to the accompanying drawing in which: Figure 1 is a sectional view of an apparatus for preparing the toxic agent.

Figure 2 is a sectional view of a modified form of preparing the toxic agent.

Figure 3 is a top plan view of the apparatus disclosed in Figure 1.

There has come into use various construction materials made from fibrous products but a great deal of difficulty has been experienced in their usage due to the fact that they are readily attacked by fungi and by insects, particularly what is commonly known as termite. To overcome these difficulties many attempts have been made to incorporate a substance in the material, but so far as it is known no successful toxic agent has been developed and applied to fibrous products, that would meet these severe requirements and, at the same time permit of the sale of treated products at a price which would result in extensive usage of such products. It has been discovered that a coal tar product when treated in the manner hereinafter to be described will overcome the difficulties heretofore experienced.

A coal tar product is so treated that a part of the material is removed leaving the toxic part. It may be said that the final product contains from 50 to 60% creosote, but it is to be understood that the coal tar product which contains 50 to 60% of creosote is not an oil but is rather a dry material. The coal tar product here under discussion is known on the market as "Reilly preservative #60". This coal tar product if disseminated through a fibrous product will not prevent it from being attacked by insects and its fungi resistant properties is not as high as is desired. Chemical analysis of the material referred to shows that it contains hydrocarbons of the general formula $C_{14}H_{10}$, creosote and its homologues, and pyridin like substances which are responsible for the toxicity of the material. The analysis discloses the pyridin like substances to be present in an amount less than .5% and this low pyridin contents is the direct reason for the final product not having an objectionable odor.

To produce a toxic agent that is fungi proof and insect repelling it has been found that by taking 26 parts of the coal tar product (Reilly preservative #60), 20 parts of wood rosin, 10 parts of flake caustic and 160 parts of hot water and placing these materials in a suitable container and cooking them for approximately 45 minutes with steam, the steam being as dry as possible. After the cooking period cold water is added to reduce it to a 10% solution. The emulsion thus prepared is extremely stable and may be stored and used as required. Any suitable rosin may be used and any suitable caustic as well may be used. The proportions may be varied but those above set forth have been found to give the most satisfactory results so far obtained.

Referring to the drawing by numerals 10 indicates a suitable container in which the emulsion is prepared. This container, for efficiency, should be insulated with a suitable material 11.

Mounted within the container are bearings or supports 12 in which are suitably mounted rigid conduits 13. At the lower end of the conduit 13 is secured a spray head 14 having any desired number of openings therein. Mounted on the pipe 13 is gear wheel 15 which is adapted to operatively cooperate with gear wheel 16. The gear 16 is mounted upon shafts 17 which has mounted thereon a pulley 18 which is adapted to receive its motive power from a source not shown.

The rosin, coal tar product, caustic and hot water is placed in the container 10 and steam is admitted by pipe 13 and nozzle head 14 which causes the cooking of the material in the container. The steam admitting spray head 14 is revolved through gear wheels 15 and 16 so that a thorough cooking and agitation of the material is obtained through the action of the steam.

Figure 1 discloses another arrangement of preparing the toxic agent and consists of a container 10 which is properly insulated to prevent heat loss by material 11. Secured in a suitable manner to the open end of the container are angle irons 20, which is adapted to support around the rim of the container gear 21. Operatively mounted on top of the container is a member 22 which is composed of spaced apart members 23 and 24. Members 23 are suitably connected to member 24 so that they form a unitary structure. Suitably mounted upon members 23 is motor 30 which is adapted, through shaft 31, to drive gear wheel 25, and in this manner causes the member 22 to revolve at a suitable speed on top of the container. The motor likewise drives cam member 25 which through pin 26, arm 28 and connecting member 29 actuating rubber hose 19 to make it to travel back and forth across the container. The rubber hose is suitably connected by coupling member 32 to a pipe leading to a suitable supply of steam. It is preferred that the discharge end of hose 19 be larger than the hose proper.

As steam is admitted to the container to cook the material placed therein top member 22 revolves and the hose member 19 moves backward and forward across the container which insures the proper agitation and cooking of the material placed therein.

The cooking period may vary over a considerable range and good results may be obtained by a cooking period of 15 minutes to 60 minutes. Highly satisfactory results have been obtained and a very stable emulsion produced by cooking the material 45 minutes.

After the toxic agent has been prepared as above described it has been discovered that the rosin is toxic as well as the coal tar products. The exact action which causes the rosin to become toxic is not known but is believed to be due to the caustic material attacking the coal tar product and releasing a substantial amount of toxic material which is taken up by the rosin. I do not wish to be limited to this theory as the procuring of a thoroughly toxic agent in which substantially, if not all, of the material is active as a toxic medium.

This toxic material is commingled with fibrous products while in the water bath within the range of 2 to 30 pounds per thousand square feet when the material is run ½" thick. Of course, this toxic agent may be sprayed on the finished product prior to drying and drawn into the fibrous material by the action of a vacuum box.

The fibrous material having the toxic agent commingled therewith is manipulated to form the fibrous product. The fibrous product is then passed through a suitable drier or subjected to other manufacturing steps which is necessary to produce the type of fibrous material desired.

It has been discovered that by using a toxic agent, prepared in the manner above described, that the loss in the white water is reduced to a minimum and likewise the loss which normally occurs in the drier is reduced to a minimum, if not entirely eliminated. Another advantage which results in using the toxic agent, as above described, is that the amount of size normally required can be materially reduced if not entirely eliminated.

To obtain the best results the pH should fall within the range of 3.5 to 6. If maintained within this range the certain qualities of the products are greatly improved. If the pH is higher than that indicated the water resisting qualities are not entirely satisfactory.

Another method of obtaining a thoroughly toxic agent is by taking a suitable amount of coal tar product, a suitable amount of caustic material and placing these in a grinding mill with a sufficient quantity of water, preferably cold water. After this material has been treated in the grinding mill for the desired length of time rosin is added, preferably wood rosin, and the solution may then be diluted any desired amount, generally to make a 10% emulsion. It is essential whatever method is used that a caustic material or its equivalent be used so that the rosin will be toxic as well as the coal tar product.

A satisfactory way of carrying out this method of preparing the toxic agent is by taking 454 parts of coal tar product, 32 parts caustic material and 900 parts of water. Subject this material for approximately one hour to treatment in a ball mill and then add 6040 parts of rosin size emulsion and subject the treated material and rosin to further action in the ball mill. This material is then diluted with water to form the desired emulsion.

Broadly this invention comprehends the preparation of a toxic material by taking a coal tar product and subjecting it to treatment with a material that releases some of the toxicity of the coal tar product which can and is taken up by rosin so that the rosin is also toxic.

It will be obvious to those skilled in the art that many variations in steps and combination of steps constituting the process may be made which falls within the scope of this invention and without departing from the spirit thereof.

What I claim is:

1. The method of rendering vegetable fiber products water repellent, insect and fungi proof, wherein the water repellent properties and the insecticide and fungi proofing are obtained through addition to a diluted suspension of fibers in water, a toxic agent prepared by cooking rosin, coal tar product of the class described containing hydrocarbons of the general formula $C_{14}H_{10}$, creosote and its homologues, and pyridin-like substances in amount less than 0.5% and a caustic material to form an emulsion, the pH of suspension being properly adjusted within the range of 3.5 to 6.

2. A method of rendering vegetable fiber products insect and fungi proof, wherein the insect and fungi proofing properties are obtained through addition to a diluted suspension of fibers in water of an emulsion containing a coal tar product of the class described containing hydrocarbons of the general formula $C_{14}H_{10}$, creosote and its homologues, and pyridin-like substances in amount less than 0.5% and a toxic inoculated rosin, the pH of the suspension being properly adjusted to render the fiber products highly water resistant, the said pH falls within the range of 3.5 to 6.

3. A method of rendering fiber products water resistant and fungi and insecticide proof which consists of steam cooking rosin, coal tar product of the class described containing hydrocarbons of the general formula $C_{14}H_{10}$, creosote and its homologues, and pyridin-like substances in amount less than 0.5% and a caustic material to form an emulsion, commingling the emulsion formed with a diluted suspension of fibers in a water bath, adjusting the pH within the range of 4 to 4.5, manipulating the mass to form a fibrous product and drying the fibrous product.

4. The method of rendering vegetable fiber products water repellent, insect and fungi proof, wherein the water resisting properties and the insect and fungi proofing are obtained through addition to a diluted suspension of fibers in water a toxic agent that has been prepared by steam treating, rosin, coal tar product of the class described containing hydrocarbons of the general formula $C_{14}H_{10}$, creosote and its homologues, and pyridin-like substances in amount less than 0.5% and a caustic material, the pH of the suspension being properly adjusted to attain the desired water resisting qualities.

5. The method of rendering vegetable fiber products water, insect and fungi proof, wherein the water resisting properties and the insect and fungi proofing are obtained through addition to a diluted suspension of fibers in water, a toxic agent that has been prepared by treating coal tar product of the class described containing hydrocarbons of the general formula $C_{14}H_{10}$, creosote and its homologues, and pyridin-like substances in amount less than 0.5% and a caustic material in a grinding mill and adding rosin and water, the pH of the suspension being properly adjusted to attain the desired water resisting qualities.

6. The process of preserving products composed of fibers of vegetable origin by felting fibers from a diluted suspension in water having commingled therewith an emulsion resulting from treating a coal tar product containing hydrocarbons of the general formula $C_{14}H_{10}$, creosote and its homologues, and pyridin-like substances in amount less than 0.5%, a caustic material, and rosin size emulsion.

7. A process of producing a fibrous product which is highly water resistant, insect and fungi proof, wherein the water resisting properties and the toxicity are obtained through the addition to the fibrous product of an emulsion resulting from treating coal tar products containing hydrocarbons of the general formula $C_{14}H_{10}$, creosote and its homologues, and pyridin-like substance in amount less than 0.5% with a material that releases some of the toxicity of the coal tar product and adding rosin size emulsion.

8. A process of rendering fibrous products insect and fungi proof by felting fibers from a diluted suspension having commingled therewith an emulsion made by treating in a grinding mill a coal tar product containing hydrocarbons of the general formula $C_{14}H_{10}$, creosote and its homologues, and pyridin-like substances in amount less than 0.5% in the presence of water.

9. A process of incorporating a toxic material in a fibrous product made by felting fibers from a diluted suspension of fibers in a water bath, by reducing a toxic agent containing hydrocarbons of the general formula $C_{14}H_{10}$, creosote and its homologues, and pyridin-like substances in amount less than 0.5% in the presence of water and a material that releases toxic substance from the toxic agent, adding rosin to the reduced material and adding the mixture to the diluted fibers prior to the formation of the fibrous product.

10. A method of rendering vegetable fiber products insect and fungi-proof, wherein the insect and fungi-proofing properties are obtained through addition to fibers in a water bath of an emulsion containing hydrocarbons of the general formula $C_{14}H_{10}$, creosote and its homologues, pyridin-like substances in amount less than 0.5%, and rosin.

GEORGE H. ELLIS.